United States Patent
Enya et al.

(10) Patent No.: US 7,092,531 B2
(45) Date of Patent: Aug. 15, 2006

(54) SOUND OUTPUT APPARATUS FOR AN AUTOMOTIVE VEHICLE

(75) Inventors: Takeshi Enya, Nagoya (JP); Yoshihisa Sato, Nagoya (JP); Isao Aichi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/353,911

(22) Filed: Jan. 30, 2003

(65) Prior Publication Data

US 2003/0142835 A1 Jul. 31, 2003

(30) Foreign Application Priority Data

Jan. 31, 2002 (JP) ............... 2002-024417
Jan. 22, 2003 (JP) ............... 2003-013514

(51) Int. Cl.
*H04B 1/00* (2006.01)
*H04B 5/00* (2006.01)
*H04R 5/00* (2006.01)
*H04R 29/00* (2006.01)
*H03G 5/00* (2006.01)
*B60Q 1/00* (2006.01)

(52) U.S. Cl. .................. 381/86; 381/302; 381/79; 381/59; 381/103; 340/435; 340/436

(58) Field of Classification Search ................ 381/86, 381/302, 150, 115–117, 332, 386–389
See application file for complete search history.

(56) References Cited

U.S. PATENT DOCUMENTS

| | | | |
|---|---|---|---|
| 4,056,165 A | 11/1977 | Okamoto et al. | |
| 4,329,544 A | 5/1982 | Yamada | |
| 4,342,023 A | 7/1982 | Tsunoda et al. | |
| 5,887,071 A * | 3/1999 | House | 381/386 |
| 5,979,586 A | 11/1999 | Farmer et al. | |
| 6,181,797 B1 * | 1/2001 | Parrella et al. | 381/86 |
| 6,345,102 B1 * | 2/2002 | Davis et al. | 381/86 |
| 6,681,024 B1 * | 1/2004 | Klein et al. | 381/389 |
| 6,778,672 B1 * | 8/2004 | Breed et al. | 381/86 |

FOREIGN PATENT DOCUMENTS

| | | |
|---|---|---|
| DE | 43 36746 A1 | 5/1995 |
| DE | 299 07 365 U1 | 8/1999 |
| EP | 0 120 126 A2 | 10/1984 |
| GB | 2224178 A | 4/1990 |
| JP | A-61-105197 | 5/1986 |
| JP | UM-H04-023399 | 2/1992 |
| JP | 7-131883 | 5/1995 |
| JP | 7-255099 | 10/1995 |
| JP | A-10-297382 | 11/1998 |
| JP | A-2000-036998 | 2/2000 |
| JP | A-2001-025086 | 1/2001 |
| JP | 2002-133596 | 5/2002 |

OTHER PUBLICATIONS

Japanese Office Action dated Jul. 5, 2005 with its English translation.

\* cited by examiner

*Primary Examiner*—Laura A. Grier
(74) *Attorney, Agent, or Firm*—Posz Law Group, PLC

(57) ABSTRACT

An output section, consisting of a pair of loudspeakers disposed adjacently to each other, is installed inside a seatback of a designated seat. Sound output surfaces of respective loudspeakers face a designated person sitting on the designated seat. It is hence easy to secure a required distance for obtaining clear acoustic image localization in accordance with the size of loudspeakers cooperatively constituting the output section.

30 Claims, 15 Drawing Sheets

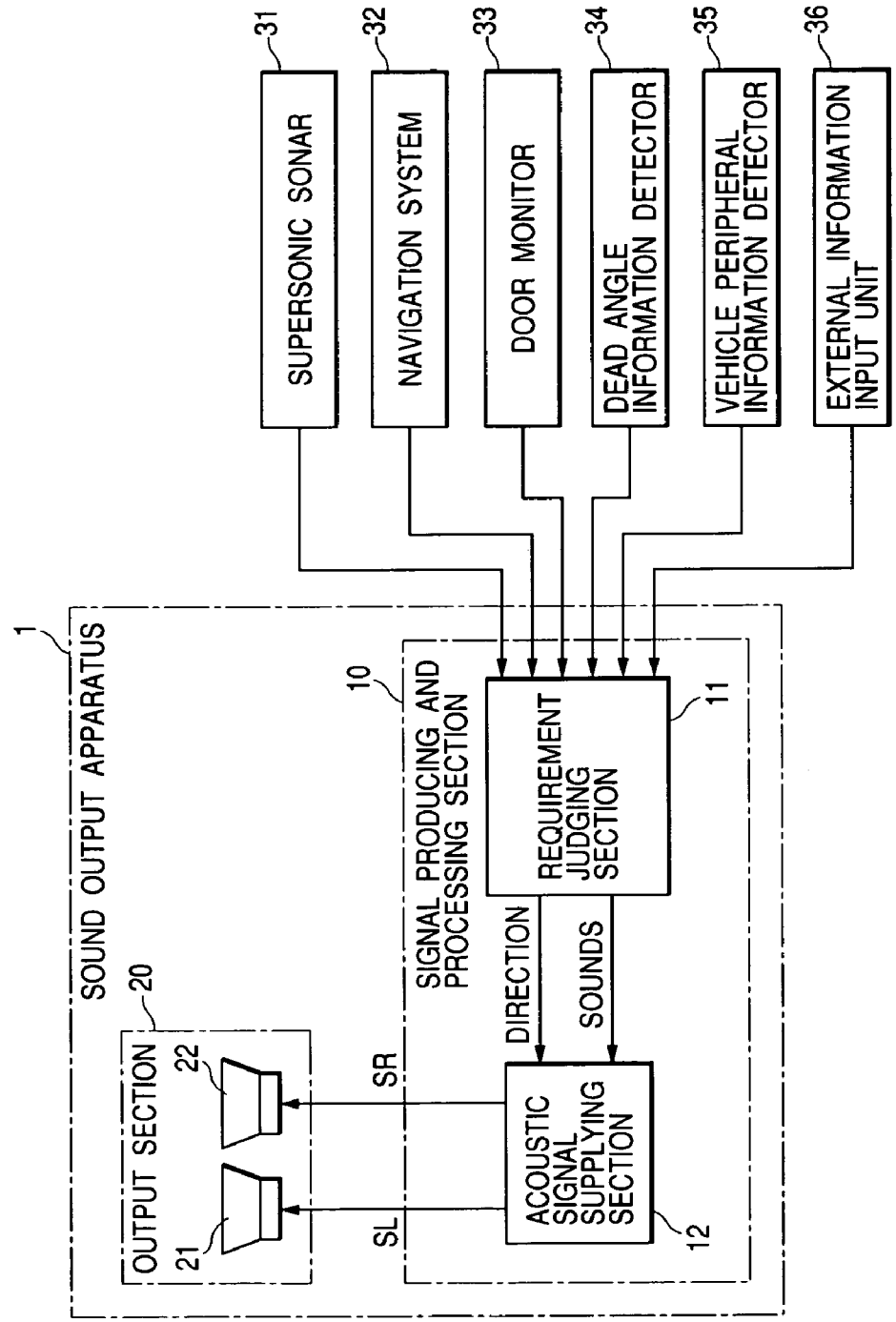

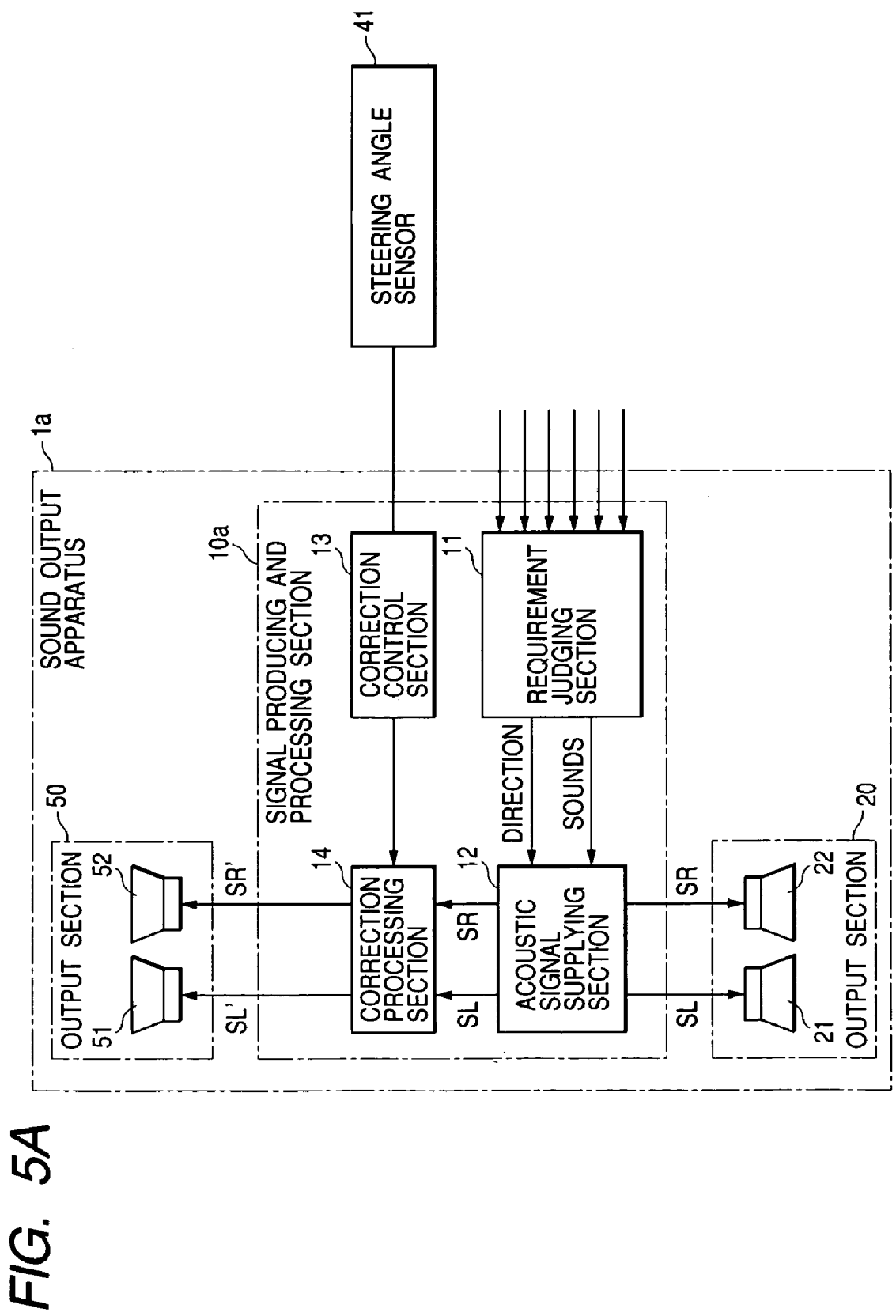

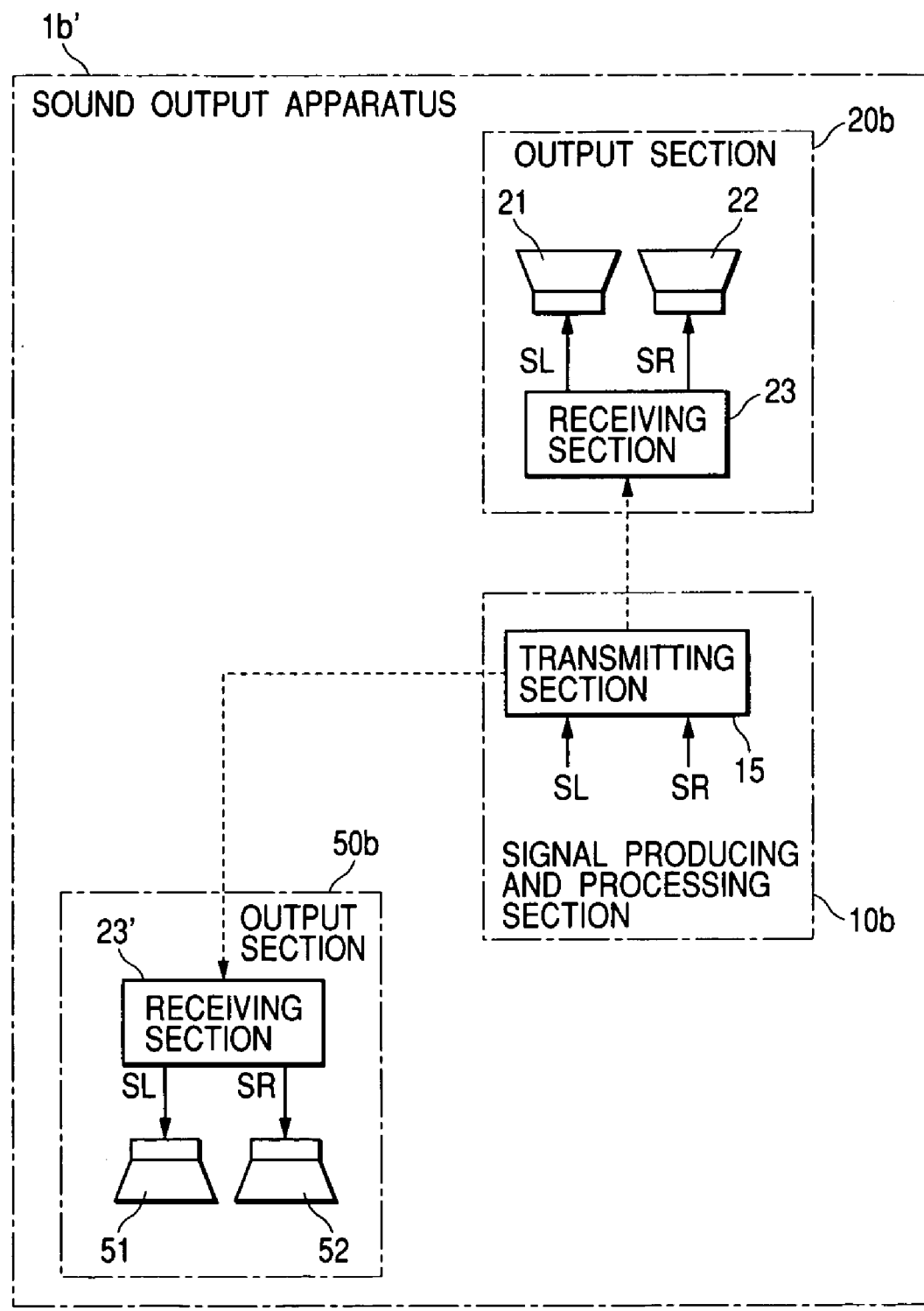

INSENSIBLE REGION

SOUND OUTPUT APPARATUS FOR AN AUTOMOTIVE VEHICLE

BACKGROUND OF THE INVENTION

This invention relates to a sound output apparatus for an automotive vehicle which generates various acoustic or sound outputs, such as warning sounds, alarms, guide voice or speech, and others.

Conventionally, an automotive vehicle is equipped with an acoustic or sound device for generating various acoustic or sound outputs to transmit necessary information to a driver or passengers in a passenger compartment. For example, various sensors are installed on an automotive vehicle to detect dangerous or abnormal conditions of the vehicle. When these sensors detect any dangerous or abnormal conditions of the vehicle, warning sounds, alarms, and voice or speech guidance from a navigation system will be generated to evoke driver's or passenger's caution and to let the driver or passengers act or behave appropriately to avoid the encountering danger or abnormality.

However, even if warning sounds or alarms are generated, there will be the possibility that a driver or passenger cannot understand the contents or meaning of the immediately generating warning sounds or alarms and also cannot know the direction to which the driver's or passenger's caution should be directed. Hence, the action or behavior of the driver or passengers to avoid the encountering danger or abnormality will be delayed. For example, supersonic sonars may be installed at four corners of a vehicle body to detect approach of any obstacle. However, if the warning sounds or alarms notifying the approach of any obstacle are always the same, a driver or passengers will not be able to immediately know or perceive the direction from which the detected obstacle is approaching. The driver and passengers will not be able to promptly and properly respond to avoid the coming danger or increasing abnormality.

Japanese Patent Application Laid-open No. 2002-133596, in paragraph 0012 and FIG. 2, discloses a warning apparatus which produces a virtual sound source by using loudspeakers installed in a passenger compartment and changes the position of the virtual sound source or tone quality in accordance with time variation or spatial or positional change of a distance between oneself and the car ahead or behind, thereby letting a driver sense the position of other vehicle.

According to this warning apparatus, production of the virtual sound source is realized by using a multichannel surround system consisting of four channel loudspeakers disposed at four corners, i.e., right and left edges of respective front and rear ends, in a passenger compartment, or by using a stereo dipole system consisting of a pair of loudspeakers disposed adjacently to each other which is preferably incorporated in a car navigation system.

Compared with other systems, the stereo dipole system has a very wide audible area in which clear acoustic or sound image localization is attained. Furthermore, as two loudspeakers are disposed adjacently to each other, the stereo dipole system can be preferable employed as an acoustic equipment installed in a narrow or limited space available in a passenger compartment.

More specifically, to obtain clear acoustic or sound image localization according to the stereo dipole system, as shown in FIG. 13, a pair of loudspeakers SP is disposed in front of an audience with an angle θ formed between two straight lines connecting respective loudspeakers SP to the audience. In this case, the required angle θ is approximately 10°. In practice, compact loudspeakers having practically usable frequency characteristics are approximately 10 cm in diameter. If these compact loudspeakers are disposed as closely as possible, the closest distance between the centers of two loudspeakers SP will be approximately 10 cm (i.e., W=10 cm). Considering this relationship, the distance L from the audience to a plane on which sound output surfaces of two loudspeakers SP are aligned should be approximately 60 cm. If the size of loudspeakers is more reduced in the future, it may be necessary to reduce the distance L.

However, the loudspeakers incorporated in a car navigation system are usually positioned in a central region on an instrument panel or a dashboard substantially equally distant from each of a driver's seat and the next passenger's seat. In other words, the loudspeakers of a car navigation system are not positioned in direct front of the driver's seat or in direct front of the passenger's seat. Therefore, it is difficult to obtain clear acoustic or sound image localization by using a car navigation system even if the stereo dipole system is employed. If the loudspeakers are downsized in the future, the above distance L may be too long to obtain clear acoustic or sound image localization.

Furthermore, according to the stereo dipole system, it is generally known that clear acoustic or sound image localization is obtained in a wide angular range of ±70°~90° with respect to a line (=0°) directing the front side of the audience, as shown in FIG. 13. In other words, there is an insensible angular zone at the back side of the audience in which no acoustic or sound image localization can be obtained. For example, according to the warning apparatus disclosed in the above-described prior art reference, a driver cannot obtain clear acoustic or sound image localization in an insensible region spreading at the back side of the driver when the loudspeakers of a car navigation system are positioned in front on a driver's seat.

SUMMARY OF THE INVENTION

In view of the above-described problems of the prior art, the present invention has an object to provide a sound output apparatus for an automotive vehicle which generates a virtual sound source in a passenger compartment based on a stereo dipole system and is capable of obtaining clear acoustic or sound image localization even when used loudspeakers are small or compact.

Another object of the present invention is to provide a sound output apparatus for an automotive vehicle which is capable of obtaining clear acoustic or sound image localization covering all of the angular regions including the back side of a driver or a passenger.

In order to accomplish the above and other related objects, the present invention provides a sound output apparatus for an automotive vehicle including a sound generating means for generating sounds and an acoustic signal producing means for generating acoustic signals to be supplied to the sound generating means. The acoustic signal producing means receives sound output requirements and identifies output sounds to be generated from the sound generating means as well as an alerting direction to which attention of a designated person should be directed. The acoustic signal producing means generates the acoustic signals to be supplied to the sound generating means so that the output sounds cooperatively obtain acoustic image localization in such a manner that a virtual sound source is positioned at a location corresponding to the alerting direction. The sound generating means includes at least a pair of loudspeakers disposed adjacently to each other, and is installed to a predetermined portion of at least a designated seat on which the designated person sits.

Preferably, the sound generating means is positioned on a symmetry axis of the designated seat.

It is also preferable that the sound generating means is positioned inside the designated seat.

Preferably, the designated seat has a plurality of through-holes or openings provided in the vicinity of the sound generating means.

Preferably, the sound generating means is positioned on a shoulder of the designated seat.

It is also preferable that the sound generating means is positioned on a top of a headrest constituting an upper part of the designated seat.

It is also preferable that the sound generating means is positioned at a back side of a seatback of the designated seat.

It is also preferable that the sound generating means is positioned beneath a seat bottom of the designated seat.

Preferably, the designated seat is a driver's seat. And, the sound generating means has a sound output surface facing a front side of the automotive vehicle.

Preferably, the sound generating means further includes a pair of loudspeakers disposed adjacently to each other and installed on a ceiling or a sun visor attached near an upper edge of a front windshield glass. And, the loudspeakers installed on the ceiling or the sun visor have sound output surfaces facing a rear side of the automotive vehicle.

Preferably, the sound generating means further includes a pair of loudspeakers disposed beneath an instrument panel or a dashboard or attached to a steering support provided for rotatably supporting a steering wheel. And, the loudspeakers, disposed beneath the instrument panel or the dashboard or attached to the steering support, have sound output surfaces facing a rear side of the automotive vehicle.

Preferably, the sound generating means further includes a pair of loudspeakers installed on a steering wheel so as to have sound output surfaces facing a rear side of the automotive vehicle. And, the acoustic signal producing means includes correcting means for correcting the acoustic signals based on a steering angle of the steering wheel and supplying corrected acoustic signals to the sound generating means.

Preferably, the sound generating means includes flat panel loudspeakers or micro loudspeakers.

Preferably, the acoustic signal producing means performs radio communication to transmit the acoustic signals or the corrected acoustic signals to the sound generating means.

Another aspect of the present invention provides a sound output apparatus for an automotive vehicle, including a sound generating means for generating sounds and an acoustic signal producing means for generating acoustic signals to be supplied to the sound generating means. The acoustic signal producing means receives sound output requirements and identifies output sounds to be generated from the sound generating means as well as an alerting direction to which attention of a designated person should be directed. The acoustic signal producing means generates the acoustic signals to be supplied to the sound generating means so that the output sounds cooperatively obtain acoustic image localization in such a manner that a virtual sound source is positioned at a location corresponding to the alerting direction. The sound generating means includes at least a pair of loudspeakers disposed adjacently to each other, and is installed on at least a designated seat positioned in front of a seat on which the designated person sits.

BRIEF DESCRIPTION OF THE DRAWINGS

The above and other objects, features and advantages of the present invention will become more apparent from the following detailed description which is to be read in conjunction with the accompanying drawings, in which:

FIG. 1 is a block diagram showing a schematic arrangement of a sound output apparatus in accordance with a first embodiment of the present invention;

FIG. 5A is a block diagram showing a schematic arrangement of a sound output apparatus in accordance with a second embodiment of the present invention;

FIG. 8B is a block diagram showing a schematic arrangement of another sound output apparatus in accordance with the third embodiment of the present invention;

DESCRIPTION OF THE PREFERRED EMBODIMENTS

Figure 2A:
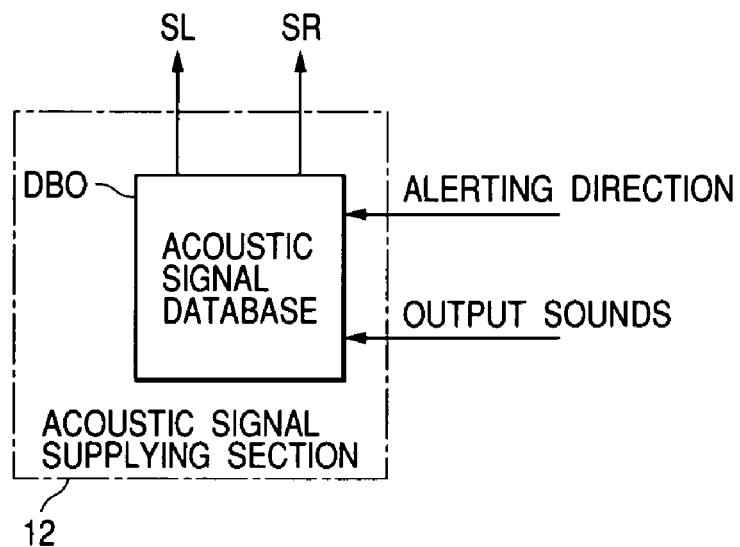
FIG. 2A is a block diagram showing an arrangement of an acoustic signal supplying section in accordance with the first embodiment of the present invention.

Preferred embodiments of the present invention will be explained hereinafter with reference to attached drawings. Identical parts or components are denoted by the same reference numerals throughout the drawings.

First Embodiment

FIG. 1 shows an automotive acoustic system in accordance with a first embodiment of the present invention;

As shown in FIG. 1, a sound output apparatus 1 of the first embodiment includes a signal producing and processing section 10 and an output section 20. The signal producing and processing section 10, serving as acoustic signal producing means of the present invention, receives sound output requirements, i.e., requirements of generating warning sounds, alarms, or guide voice or speech, from various portions of a vehicle and produces a right channel signal SR and a left channel signal SL as acoustic signals for generating output sounds in accordance with the received sound output requirements. The output section 20 consists of a pair of loudspeakers 21 and 22, cooperatively serving as output sound generating means of the present invention, which reproduces a sound source of a stereo dipole type (i.e., generates output sounds).

The output section 20, consisting of the loudspeakers 21 and 22, is positioned on a symmetry axis of a designated seat of an automotive vehicle. Each of the loudspeakers 21 and 22 includes a flat magnet disposed on a plane and a diaphragm (i.e., vibration plate) disposed closely and parallel to this plane. The diaphragm causes vibration in response to the acoustic signals SR and SL supplied to a conductive circuit provided on the diaphragm, thereby generating output sounds. Namely, each of the loudspeakers 21 and 22 is a flat panel speaker.

Figure 3A:
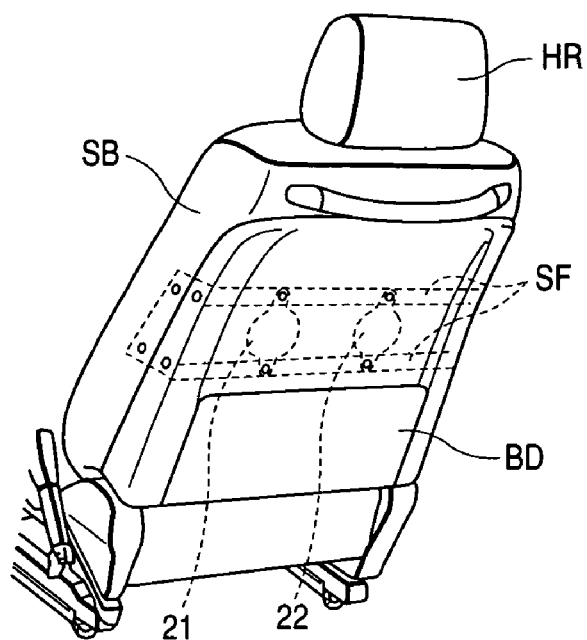
FIG. 3A is a perspective view showing an output section installed in a seat of an automotive vehicle in accordance with the first embodiment of the present invention.

More specifically, as shown in FIG. 3A, the output section 20 is installed in a seatback SB of each seat in a passenger compartment of an automotive vehicle. The loudspeakers 21 and 22 are fixed by means of screws to a speaker frame SF provided in the seatback SB along the back surface thereof so that sound output surfaces of the loudspeakers 21 and 22 face the front side of the automotive vehicle. The speaker frame SF is fixed to a seatback frame (not shown) or to a seatback board BD.

Figure 3B:
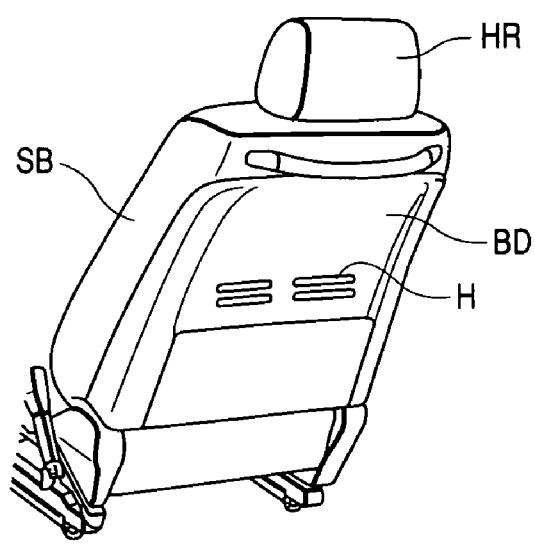
FIG. 3B is a perspective view showing a seatback board covering the output section installed in a seat of an automotive vehicle in accordance with the first embodiment of the present invention.
Figure 3C:
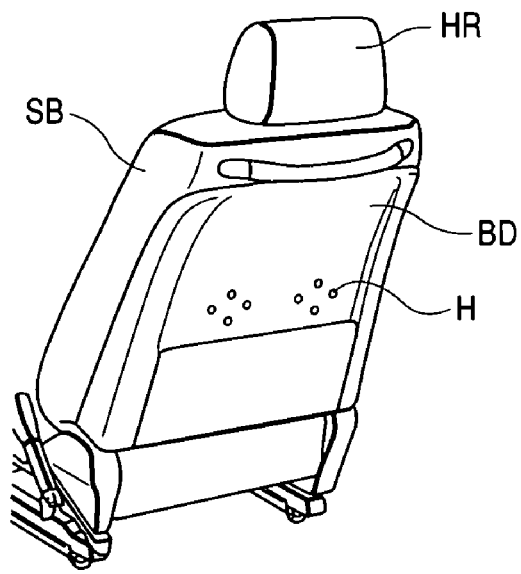
FIG. 3C is a perspective view showing another seatback board covering the output section installed in a seat of an automotive vehicle in accordance with the first embodiment of the present invention.

As shown in FIG. 3B, the seatback board BD extends along the back surface of the seat back SB and has a plurality of slit holes H which are positioned in the vicinity of the loudspeakers 21 and 22 to release confined sounds out of the seat back SB. Alternatively, as shown in FIG. 3C, it is preferable that the seatback board BD has a plurality of circular or mesh holes H. In any case, the holes H provided on the seatback board BD are through-holes or openings.

On the other hand, when a seat has no seatback board BD, it is preferable to attach a reinforcing plastic board to a seat skin or leather from the inside of the seatback SB. In this case, the through-holes or openings H can be provided in the region reinforced by the plastic board.

Returning to FIG. 1, the signal producing and processing section 10 consists of a requirement judging section 11 and an acoustic signal supplying section 12. The requirement judging section 11 designates the type of output sounds and identifies the alerting direction based on the above-described sound output requirements. In other words, identification of the alerting direction is identification of the position of a virtual sound source to which a driver or other passengers should direct his/her or their attention. The acoustic signal supplying section 12 produces the acoustic signals SR and SL supplied to the loudspeakers 21 and 22 which produce sounds so as to cooperatively obtain intended acoustic image localization in such a manner that the position of the virtual sound source corresponds to the alerting direction specified or designated by the requirement judging section 11.

To get sound output requirements, the requirement judging section 11 receives various signals or data sent from various portions of an automotive vehicle, such as a supersonic sonar 31, a navigation system 32, a door monitor 33, a dead angle information detector 34, a vehicle peripheral information detector 35, and an external information input unit 36. The supersonic sonar 31, installed at each of the four corners of a vehicle body or front and rear edges of a vehicle body, detects obstacles exiting around the vehicle. The navigation system 32 sets a driving route to a destination and provides voice or speech guidance along the route being thus designated. The door monitor 33 detects incomplete closing of each door based on a door sensor installed in or near each door. The dead angle information detector 34 detects an obstacle existing in a dead angle zone with respect to a driver's seat by using a radar or a camera. The vehicle peripheral information detector 35 detects any obstacles, including other cars or motorbikes traveling on the same road as well as pedestrians walking along the edge of this road, which may endanger the situation of a traveling vehicle installing this sound output apparatus 1 based on the sensing or measurement data obtained from a radar or a camera. The external information input unit 36 obtains road conditions and other vehicle's conditions by performing vehicle-to-road communications and/or vehicle-to-vehicle communications.

For example, the requirement judging section 11 identifies (i.e., specifies or designates) the type of output sounds, i.e., the kind or quality of warning or alarm sounds, as well as the alerting direction, i.e., the position of a detected obstacle or an approaching vehicle, in response to the sound output requirements sent from the supersonic sonar 31, the dead angle information detector 34, and the vehicle peripheral information detector 35. Furthermore, the requirement judging section 11 specifies or designates the type of output sounds, i.e., the kind or quality of warning or alarm sounds, as well as the alerting direction, i.e., the position of a detected door, in response to the sound output requirements sent from the door monitor 33. Furthermore, the requirement judging section 11 specifies or designates the type of output sounds, i.e., the contents of guide voice or speech, as well as the alerting direction, i.e., the direction representing the contents of the guide voice of speech or the direction of an object represented by the guide voice or speech, in response to the sound output requirements sent from the navigation system 32 and the external information input unit 36. For example, the contents of the guide voice of speech include directional suggestion at an intersection passing through when the vehicle travels along the guided driving route. For example, the direction of an object represented by the guide voice or speech includes the direction of a building serving as a target when the vehicle travels along the guided driving route.

Furthermore, as shown in FIG. 2A, the acoustic signal supplying section 12 includes an acoustic signal database DBO which stores beforehand numerous sound data for synthesizing the acoustic signals SR and SL, which are classified according to the parameters of the type of output sounds as well as the alerting direction. The acoustic signal supplying section 12 reads out appropriate sound data from the acoustic signal database DBO in accordance with the type of output sounds as well as the alerting direction specified or designated by the requirement judging section 11, and then outputs the acoustic signals SR and SL corresponding to the readout data to the loudspeakers 21 and 22.

Figure 2B:
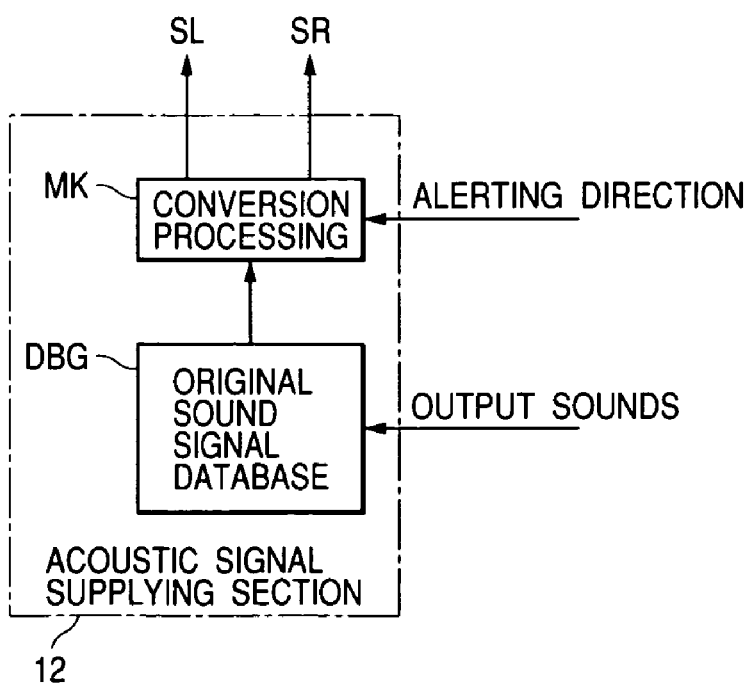
FIG. 2B is a block diagram showing an arrangement of another acoustic signal supplying section in accordance with the first embodiment of the present invention.

Alternatively, as shown in FIG. 2B, the acoustic signal supplying section 12 includes an original sound signal database DBG which stores beforehand numerous original sound data which are classified according to only the parameter of the type of output sounds. The acoustic signal supplying section 12 reads out appropriate original sound data from the original sound signal database DBG in accordance with the type of output sounds specified or designated by the requirement judging section 11, and then outputs an original sound signal. Furthermore, the acoustic signal supplying section 12 includes a conversion processing section MK which receives the original sound signal and processes or modifies it according to the alerting direction specified or designated by the requirement judging section 11, to obtain intended acoustic image localization in such a manner that a virtual sound source is positioned at a location corresponding to the alerting direction specified or designated by the requirement judging section 11. Then, the acoustic signal supplying section 12 outputs the acoustic signals SR and SL created by the conversion processing section MK to the loudspeakers 21 and 22. In this case, the original sound signal database DBG is very small in a required memory capacity compared with that of the acoustic signal database DBO.

For example, the conversion processing section MK performs FFT conversion for modifying the original sound signal supplied from the original sound signal database DBG into frequency components, so as to give a frequency-dependent level difference and a frequency-dependent phase difference between the right and left channel signals produced from the original sound signal. Then, the conversion processing section MK performs inverse FFT conversion for constructing the acoustic signals SR and SL. In other words, the acoustic signal supplying section 12 shown in FIG. 2B controls the level difference and the phase difference (i.e., time difference) of the sounds perceived by right and left ears of a driver or passengers to let the driver or passengers feel the presence of a virtual sound source localized in the alerting direction.

Alternatively, the conversion processing section MK shown in FIG. 2B performs convolution calculation by using a coefficient selected according to the alerting direction specified or designated by the requirement judging section 11 and the original sound signal supplied from the original sound signal database DBG, and then outputs the acoustic signals SR and SL corresponding to the calculation result.

When the acoustic signal supplying section 12 includes the conversion processing section MK, it is also preferable that the original sound signal database DBG stores FFT conversion data modified from the original sound signal instead of storing the original sound data.

According to the above-described sound output apparatus 1 of the first embodiment, the requirement judging section 11 specifies or designates the type of output sounds as well as the alerting direction in accordance with the sound output requirements entered from various portions 31 to 36 of the automotive vehicle. The acoustic signal supplying section 12 supplies the acoustic signals SR and SL corresponding to the type of output sounds and the alerting direction specified or designated by the requirement judging section 11. The output section 20, including a pair of loudspeakers 21 and 22, emits the sounds according to the acoustic signals SR and SL toward a driver or a passenger seated in a designated seat as shown in FIG. 4B.

According to the sound output apparatus 1 of the first embodiment, a designated driver or passenger can obtain a feeling as if the sound source (virtual sound source) is positioned in the alerting direction. This feeling is generally referred to as localization of acoustic or sound image. Thus, when any warning or alarming sound or guide voice or speech is generated, the designated driver or passenger can immediately perceive or grasp the alerting direction to which his/her attention should be directed and also can promptly judge or understand the contents or meaning of the output sounds having been thus generated.

Furthermore, according to the above-described sound output apparatus 1 of the first embodiment, the output section 20 is installed inside a seat of an automotive vehicle. It is hence easy to secure a required distance L for obtaining clear acoustic image localization in accordance with the size of loudspeakers 21 and 22 cooperatively constituting the output section 20. In other words, this gives a great degree of freedom in installing the loudspeakers 21 and 22.

Furthermore, according to the above-described sound output apparatus 1 of the first embodiment, the output section 20 is positioned behind the designated driver or passenger. The sound output surface of each speaker faces the designated driver or passenger, i.e., toward the front side of an automotive vehicle. Especially, this arrangement surely provides clear acoustic image localization entirely covering a rear or behind region where the driver who cannot visually check the momentary situation when he/she is maneuvering a steering wheel.

Furthermore, according to the above-described first embodiment, the loudspeakers 21 and 22 cooperatively constituting the output section 20 are flat panel loudspeakers which are easily installable inside the seatback SB and give no adverse influence to the properties or characteristics, such as softness or flexibility, inherent to the seatback SB. Hence, no bad feeling is given to the driver or passenger sitting thereon.

Figure 4A:
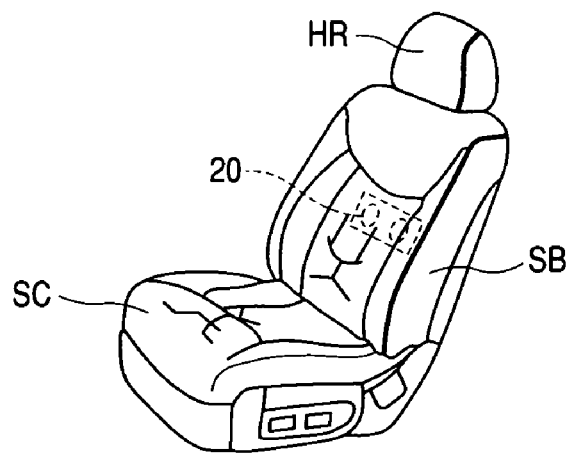
FIG. 4A is a perspective view showing the output section installed inside a seatback of an automotive vehicle in accordance with the first embodiment of the present invention.
Figure 4B:
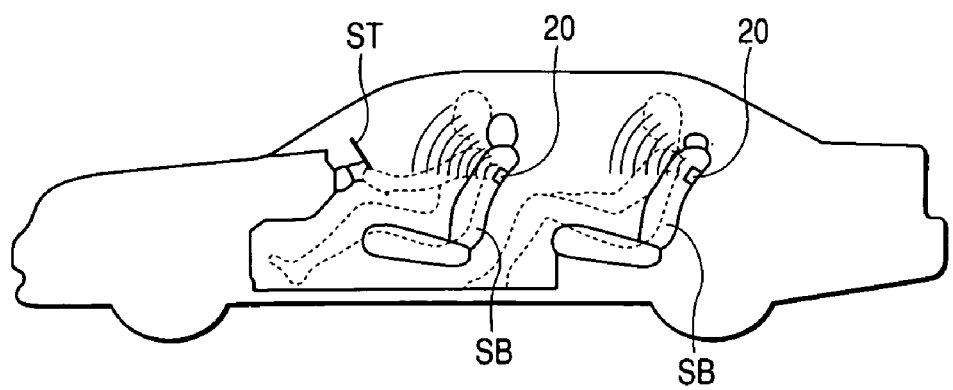
FIG. 4B is a side view showing the direction of a sound output surface of the output section installed in a seatback of an automotive vehicle in accordance with the first embodiment of the present invention.
Figure 4C:
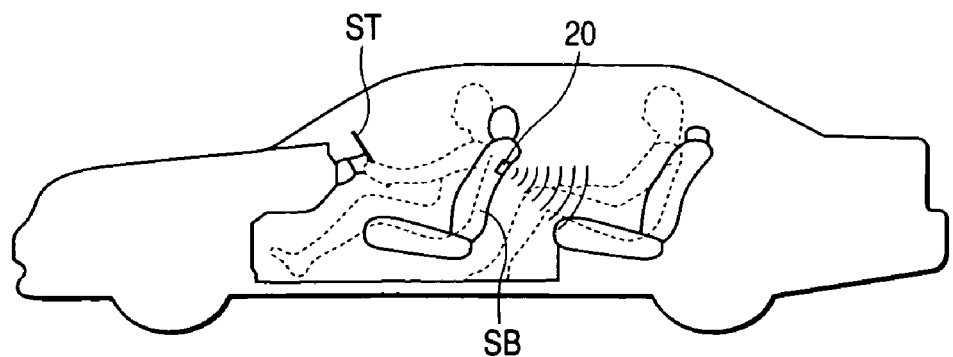
FIG. 4C is a side view showing another direction of the sound output surface of the output section installed in a seatback of an automotive vehicle in accordance with the first embodiment of the present invention.
Figure 13:
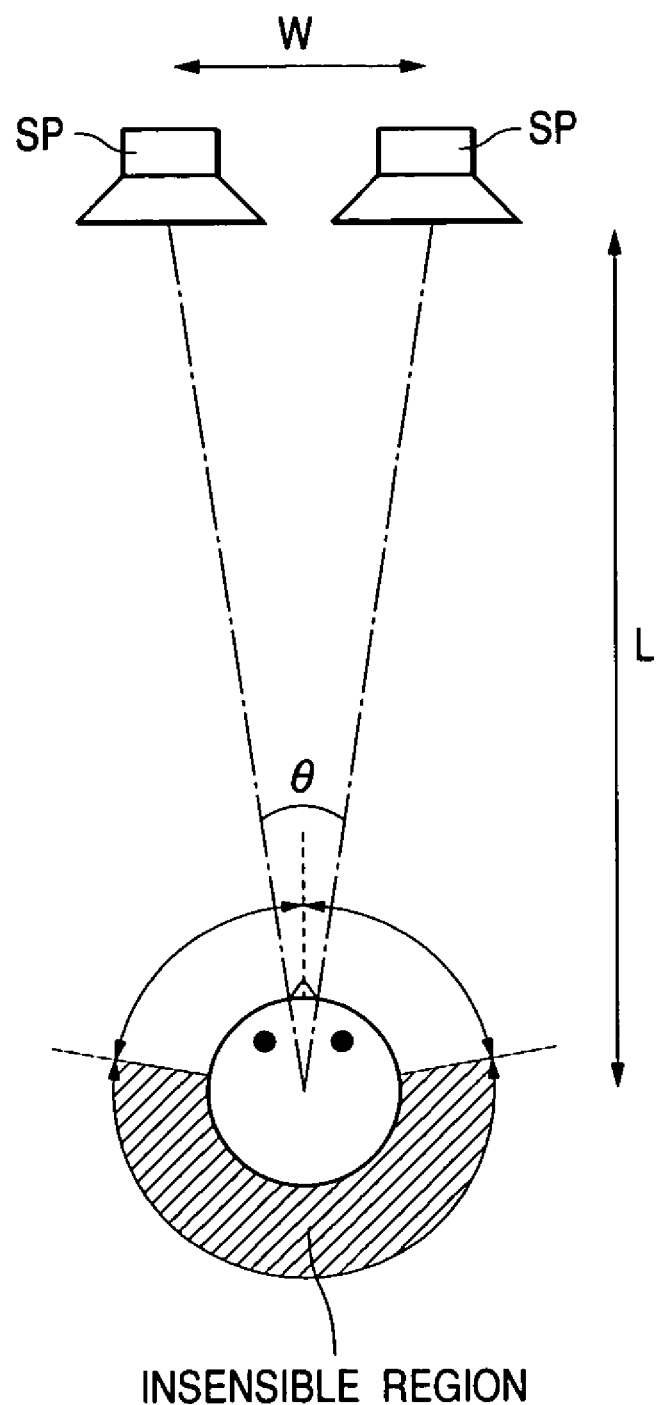
FIG. 13 is a plan view showing the installation conditions of stereo dipole type loudspeakers and the output sound characteristics thereof.

Alternatively, according to the first embodiment, it is possible to install the loudspeakers 21 and 22 in such a manner that their sound output surfaces face the rear side of an automotive vehicle as shown in FIG. 4C. In this case, the loudspeakers 21 and 22 are placed in front of a passenger sitting on a rear seat and therefore it becomes possible to provide clear acoustic image localization for the passenger sitting on the rear seat in the same manner as shown in FIG. 13.

Furthermore, the installation position of the output section 20 is not limited to the one shown in FIG. 4A. For example, it is possible to install the output section 20 on a upper portion or a lower portion in a passenger compartment.

Second Embodiment

FIG. 5A shows an automotive acoustic system using a sound output apparatus 1a in accordance with a second embodiment of the present invention.

The sound output apparatus 1a of the second embodiment is different from the sound output apparatus 1 of the first embodiment in that the following components being newly added.

The sound output apparatus 1a consists of a signal producing and processing section 10a, the output section 20, and another output section 50. The output section 20, serving as a primary output section, includes a pair of loudspeakers 21 and 22 which is installed inside the seatback SB as already explained in the first embodiment. The output section 50, consisting of a pair of loudspeakers 51 and 52, is installed on a steering wheel ST.

Figure 6A:
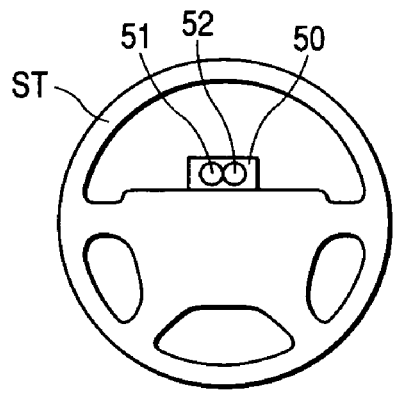
FIG. 6A is a front view showing an output section installed on an upper portion of a steering wheel of an automotive vehicle in accordance with the second embodiment of the present invention.
Figure 6B:
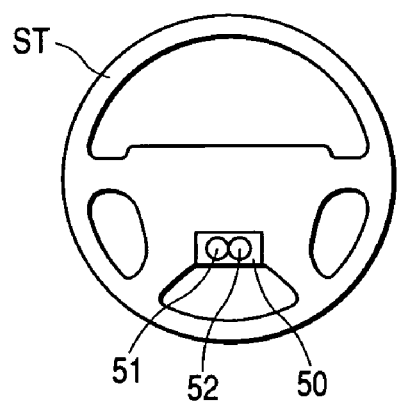
FIG. 6B is a front view showing another output section installed on a lower portion of a steering wheel of an automotive vehicle in accordance with the second embodiment of the present invention.
Figure 6C:
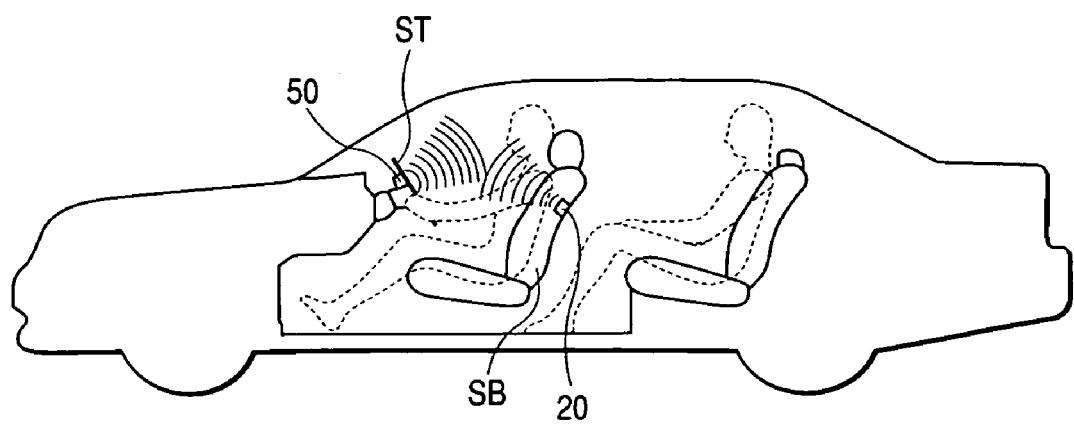
FIG. 6C is a side view showing the direction of a sound output surface of the output section installed on the steering wheel of an automotive vehicle in accordance with the second embodiment of the present invention.

For example, the output section 50 is installed at an upper portion of the steering wheel ST (when it is held at a neutral position) with respect to its rotary shaft as shown in FIG. 6A, or at a lower portion of the steering wheel ST as shown in FIG. 6B. In each case, sound output surfaces of the loudspeakers 51 and 52 face a driver's seat, i.e., face the rear side of an automotive vehicle.

Returning to FIG. 5A, the signal producing and processing section 10a includes a correction control section 13 and a correction processing section 14 in addition to the requirement judging section 11 and the acoustic signal supplying section 12. The correction control section 13 receives a sensing signal representing a steering angle detected by a steering angle sensor 41. The correction control section 13 obtains a correction amount for each of the acoustic signals SR and SL based on the steering angle detected by the steering angle sensor 41. The correction processing section 14 receives the acoustic signals SR and SL supplied from the acoustic signal supplying section 12 and corrects the acoustic signals SR and SL based on the correction amounts obtained by the correction control section 13. The correction processing section 14 supplies corrected acoustic signals SR' and SL' to the output section 50. The rest of the arrangement of the signal producing and processing section 10a is the same as that of the above-described signal producing and processing section 10 of the first embodiment. The correction control section 13 and the correction processing section 14 cooperatively serve as correcting means of the present invention.

The positional or angular relationship between two loudspeakers 51 and 52 constituting the output section 50 is variable dependent on the steering operation of the steering wheel ST. The correction processing section 14 performs the above-described correction to substantially cancel the effects of such a positional or angular dislocation of the loudspeakers 51 and 52.

According to the sound output apparatus 1a of the second embodiment, the front side of a driver is an insensible region when the sounds are produced from the output section 20 while the rear side of the driver is an insensible region when the sounds are produced from the output section 50. Providing the output section 20 and the output section 50 at both, i.e., rear and front, sides of the driver makes it possible to completely eliminate such insensible regions. Thus, it becomes possible to obtain the clear acoustic image localization covering all of the angular regions with respect to the designated person, such as a driver.

According to the second embodiment, it is possible to modify the signal producing and processing section 10a in the following manner.

Figure 5B:
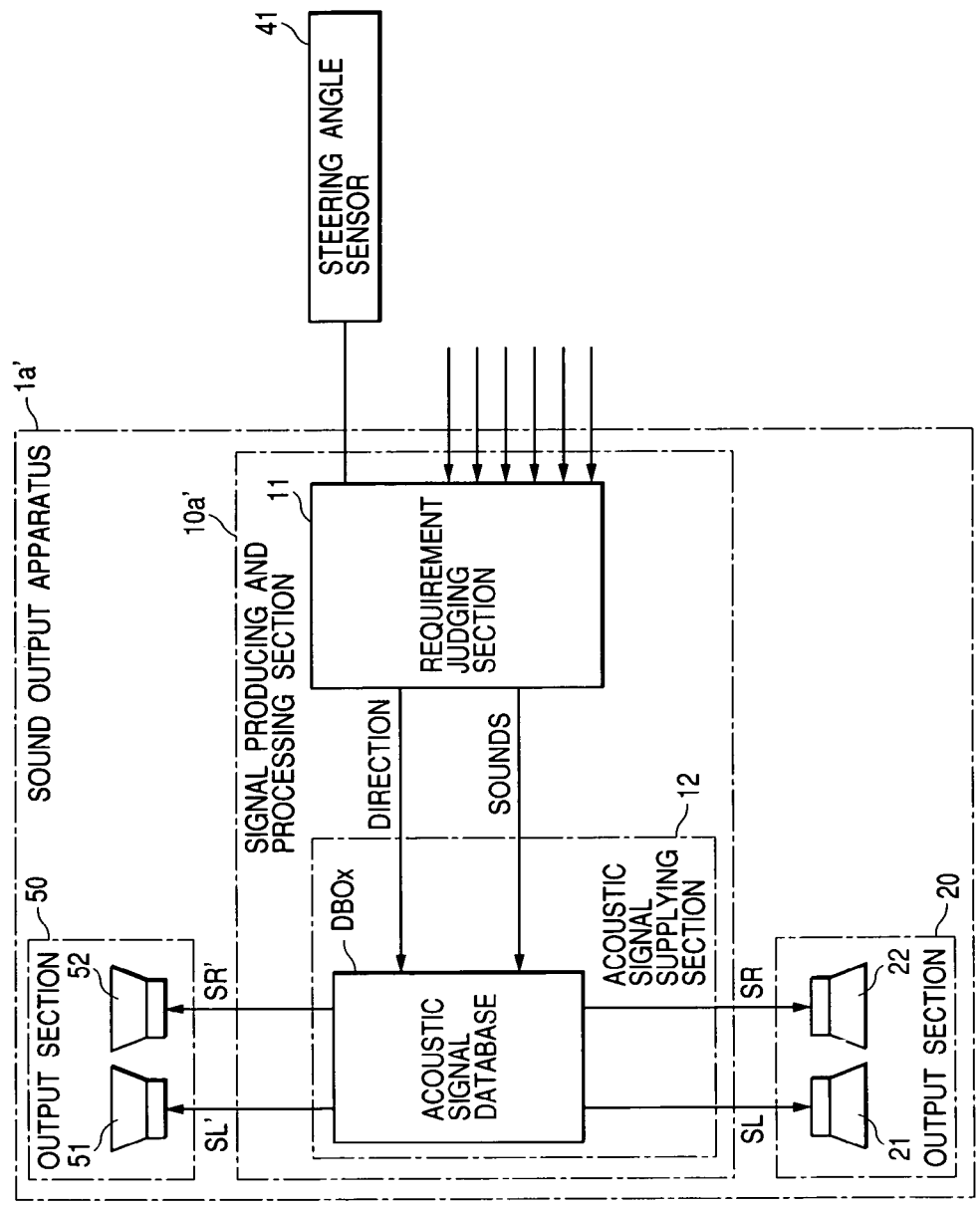
FIG. 5B is a block diagram showing a schematic arrangement of another sound output apparatus in accordance with the second embodiment of the present invention.

Instead of using the correction control section 13 and the correction processing section 14, an acoustic signal database DBOx is provided in the acoustic signal supplying section 12 of the signal producing and processing section 10a, as shown in FIG. 5B. The acoustic signal database DBOx stores beforehand numerous sound data for synthesizing the acoustic signals SR and SL, which are classified according to the parameters of the steering angle in addition to the type of output sounds and the alerting direction. The sensing signal of the steering angle sensor 41 is directly entered into the requirement judging section 11. The acoustic signal supplying section 12 reads out appropriate sound data from the acoustic signal database DBOx in accordance with not only the type of output sounds and the alerting direction but also the steering angle specified or designated by the requirement judging section 11, and then outputs the corrected acoustic signals SR' and SL' reflecting the positional or angular dislocation of the steering wheel ST to the output section 50. Meanwhile, the acoustic signal supplying section 12 supplies to the output section 20 the acoustic signals SR and SL which are determined based on the type of output sounds and the alerting direction and not corrected based on the steering angle.

Figure 7A:
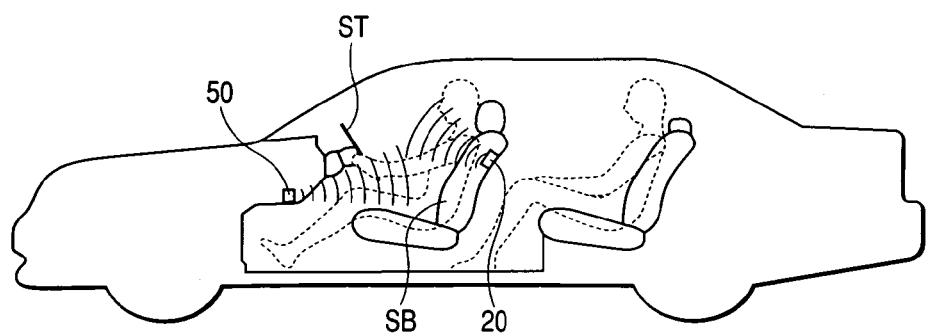
FIG. 7A is a side view showing another output section installed beneath a dashboard of an automotive vehicle and the direction of a sound output surface of this output section in accordance with the second embodiment of the present invention.
Figure 7B:
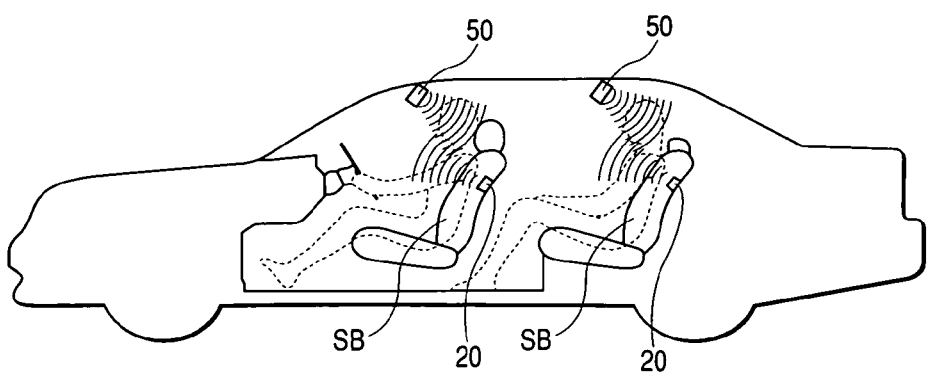
FIG. 7B is a side view showing another output section installed on a ceiling of an automotive vehicle and the direction of a sound output surface of this output section in accordance with the second embodiment of the present invention.

Furthermore, according to the above-described second embodiment, the output section 50 can be installed at a stationary portion which does not rotate together with the steering shaft. For example, the output section 50 can be installed beneath an instrument panel or a dashboard, i.e., attached on a lower or bottom portion of the instrument panel or the dashboard or attached to a steering support provided for rotatably supporting the steering wheel (ST), as shown in FIG. 7A or can be installed on a ceiling or on a sun visor attached near the upper edge of a front windshield glass as shown in FIG. 7B. In these cases, both of the correction control section 13 and the correction processing section 14 are omitted because there is no necessity of correcting the acoustic signals SR and SL based on the steering angle.

Third Embodiment

Figure 8A:
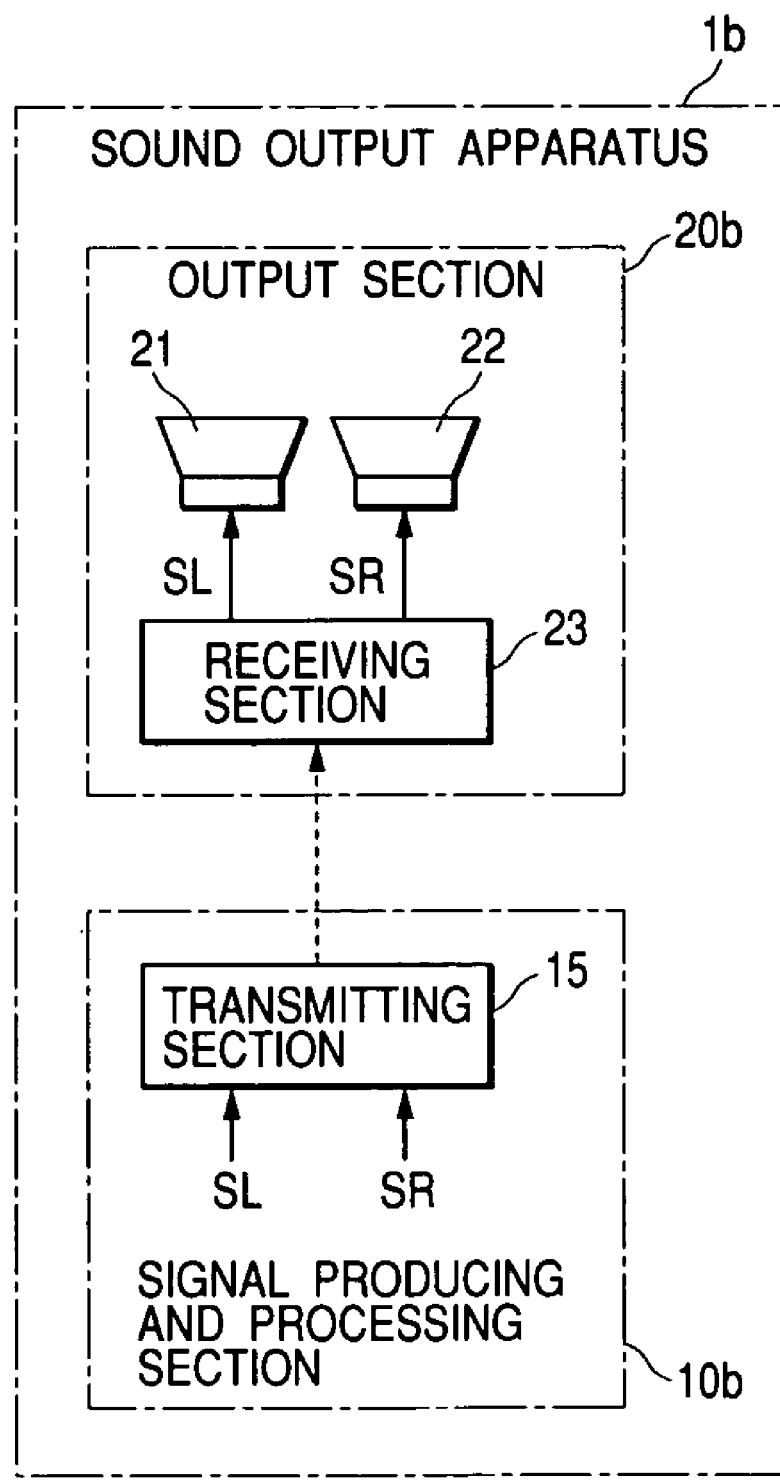
FIG. 8A is a block diagram showing a schematic arrangement of a sound output apparatus in accordance with a third embodiment of the present invention.

FIG. 8A shows a sound output apparatus 1b in accordance with a third embodiment which is different from the sound output apparatus 1 of the first embodiment or the sound output apparatus 1a of the second embodiment in the following features.

As shown in FIG. 8A, the sound output apparatus 1b consists of a signal producing and processing section 10b and an output section 20b. The signal producing and processing section 10b is different from the signal producing and processing section 10 of the first embodiment or the signal producing and processing section 10b of the second embodiment in that a transmitting section 15 is additionally provided. The transmitting section 15 receives the acoustic signals SR and SL supplied from the acoustic signal supplying section 12 or the correction processing section 14 and converts the received acoustic signals SR and SL into radio signals, and transmits the converted radio signals in the air. The output section 20b is different from the output section 20 of the first or second embodiment in that a receiving section 23 is additionally provided. According to another sound output apparatus 1b' shown in FIG. 8B, a receiving section 23' is also provided in an output section 50b. The receiving section 23 (or 23') receives the radio signal transmitted from the transmitting section 15 and restores the original acoustic signals SR and SL based on the received radio signals. The restored acoustic signals SR and SL are supplied to the loudspeakers 21 and 22 (or the loudspeakers 51 and 52).

The sound output apparatus 1b or 1b' of the third embodiment is preferably employed in a situation that the signal producing and processing section 10b and the output section 20b are spaced far from each other and cannot be connected via signal lines. The sound output apparatus 1b is easy to install and has a great degree of freedom in the installation.

Other Embodiments

The present invention is not limited to the above-described first to third embodiments and therefore can be variously modified without departing from the scope of the present invention.

For example, according to the above-described embodiments, the flat panel loudspeakers are used to constitute the output section 20 or 20b (50 or 50b). However, the flat panel loudspeakers can be replaced by micro loudspeakers which are preferably employed in portable telephones. If a sufficient installation space is available, it will be possible to employ other large-scale loudspeakers, such as cone loudspeakers, for the output section 20 or 20b (50 or 50b).

Furthermore, it is possible to supply electric power from the same or common electric power source to the signal producing and processing section 10 (10b, 10c) and to the output section 20 (20b) or 50 (50b). Alternatively, it is possible to supply electric power from separate or independent electric power sources to the signal producing and processing section 10 (10b, 10c) and to the output section 20 (20b) or 50 (50b). It is thus preferable to utilize an appropriate power source of a device disposed closely to these components.

According to the above-described embodiments, the output section 20 is installed inside the seatback SB. However, it is also possible to provide the output section 20 on an outer surface of the seat or inside other portion of the seat (including a seat bottom SC and a headrest HR) as long as the installation of the output section 20 gives no adverse influence to the inherent properties or characteristics of the seat, such as softness or flexibility, and hence no bad feeling is given to the driver or passenger sitting thereon.

Figure 9A:
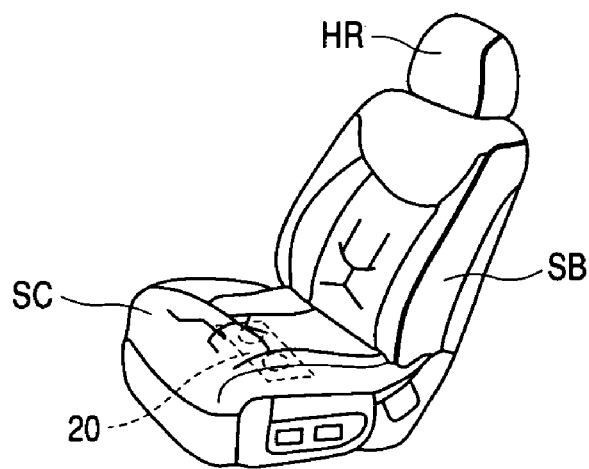
FIG. 9A is a perspective view showing an output section installed inside a seat bottom of an automotive vehicle in accordance with other embodiment of the present invention.
Figure 9B:
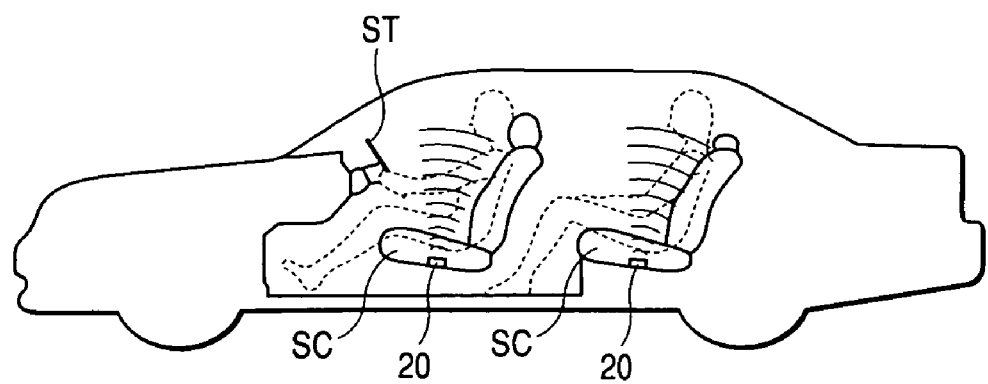
FIG. 9B is a side view showing the direction of a sound output surface of the output section installed inside a seat bottom of an automotive vehicle in accordance with the embodiment shown in FIG. 9A.
Figure 9C:
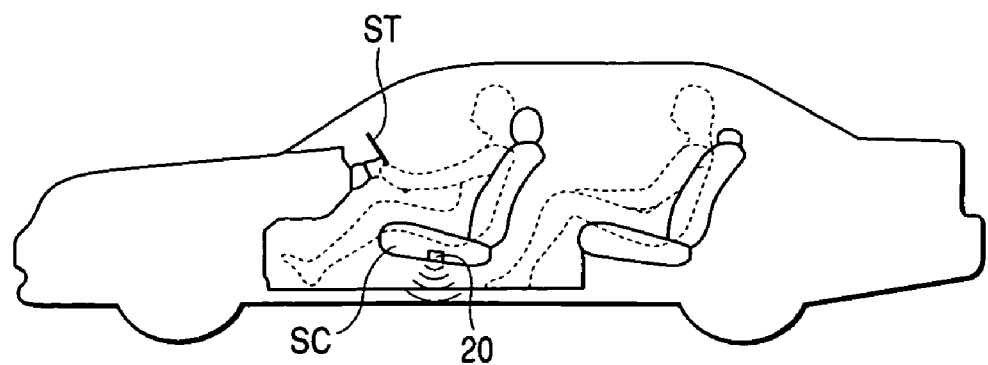
FIG. 9C is a side view showing another direction of the sound output surface of the output section installed in a seat bottom of an automotive vehicle in accordance with the embodiment shown in FIG. 9A.

For example, the output section 20 can be installed inside the seat bottom SC as shown in FIG. 9A. In this case, the sound output surfaces of loudspeakers 21 and 22 face a driver or passenger siting thereon, i.e., face the ceiling of an automotive vehicle, as shown in FIG. 9B. It is also possible to reverse the direction of the loudspeakers 21 and 22 so that their sound output surfaces face the floor of an automotive vehicle, as shown in FIG. 9C.

Figure 10A:
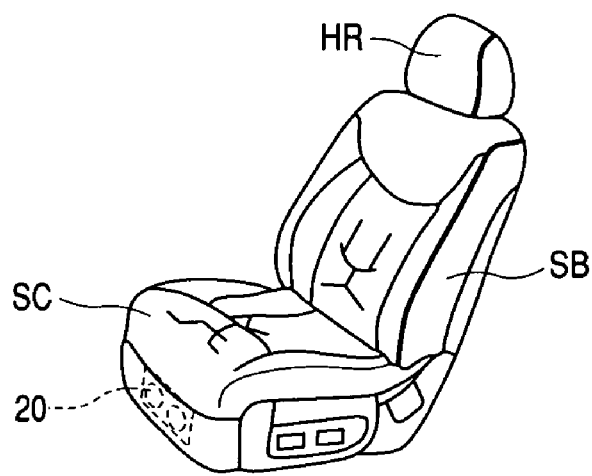
FIG. 10A is a perspective view showing another output section installed beneath a seat bottom of an automotive vehicle in accordance with other embodiment of the present invention.
Figure 10B:
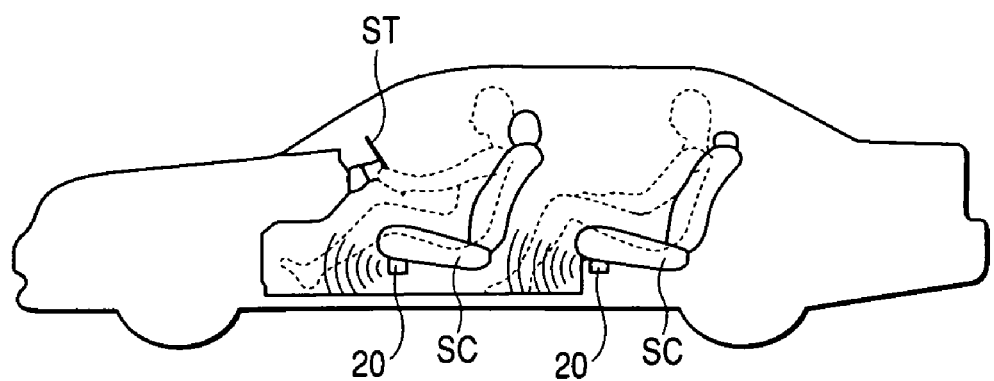
FIG. 10B is a side view showing the direction of a sound output surface of the output section installed beneath the seat bottom of an automotive vehicle in accordance with the embodiment shown in FIG. 10A.
Figure 10C:
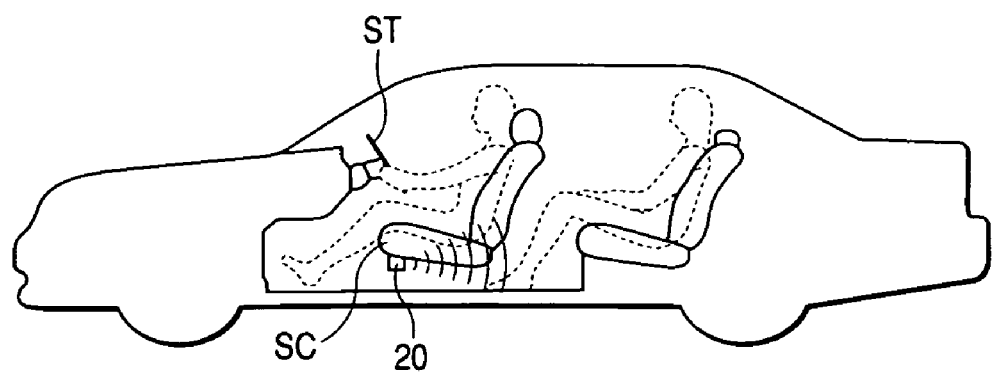
FIG. 10C is a side view showing another direction of the sound output surface of the output section installed beneath the seat bottom of an automotive vehicle in accordance with the embodiment shown in FIG. 10A.

Furthermore, the output section 20 can be installed beneath the seat bottom SC as shown in FIG. 10A. In this case, the sound output surfaces of loudspeakers 21 and 22 face the front side of an automotive vehicle, as shown in FIG. 10B. It is also possible to reverse the direction of the loudspeakers 21 and 22 so that their sound output surfaces face the rear side of an automotive vehicle, as shown in FIG. 10C.

The installation position of the output section 20 is not limited to the position shown in FIG. 9A or 10A, and therefore can be further shifted forward or backward if necessary.

Figure 11A:
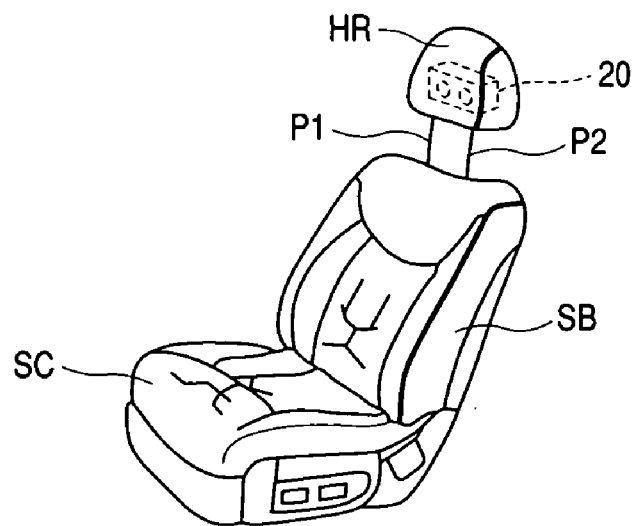
FIG. 11A is a perspective view showing another output section installed inside a headrest of an automotive vehicle in accordance with other embodiment of the present invention.
Figure 11B:
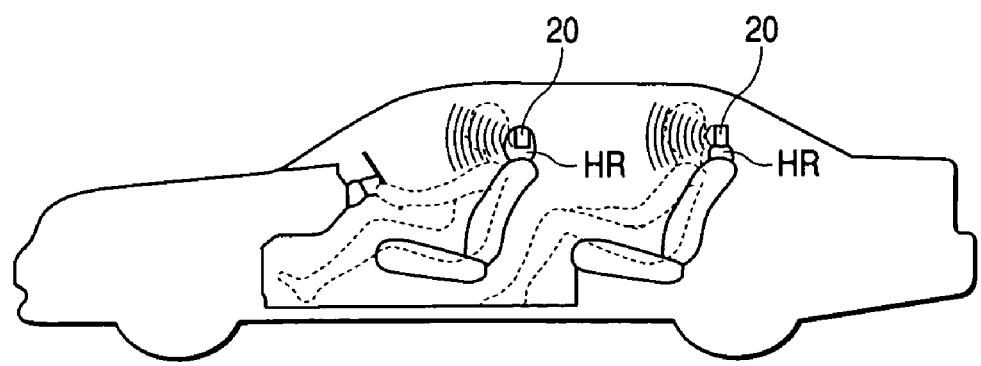
FIG. 11B is a side view showing the direction of a sound output surface of the output section installed inside a headrest of an automotive vehicle in accordance with the embodiment shown in FIG. 11A.
Figure 11C:
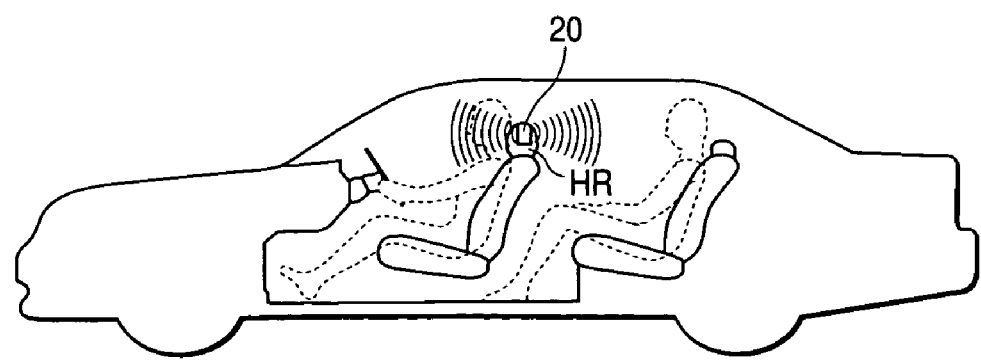
FIG. 11C is a side view showing another direction of the sound output surface of the output section installed inside a headrest of an automotive vehicle in accordance with the embodiment shown in FIG. 11A.

Furthermore, as shown in FIG. 11A, the output section 20 can be installed inside the headrest HR which is placed on the seatback SB. In this case, the sound output surfaces of loudspeakers 21 and 22 face the head of a designated driver or passenger, i.e., face the front side of an automotive vehicle, as shown in FIG. 11B. It is also possible to install the output section 20 in the headrest HR of a front seat and provides two, front and rear, sound output surfaces for each of the loudspeakers 21 and 22 so that the sound output surfaces face the passengers sitting on the front and rear seats as shown in FIG. 11C.

Figure 12A:
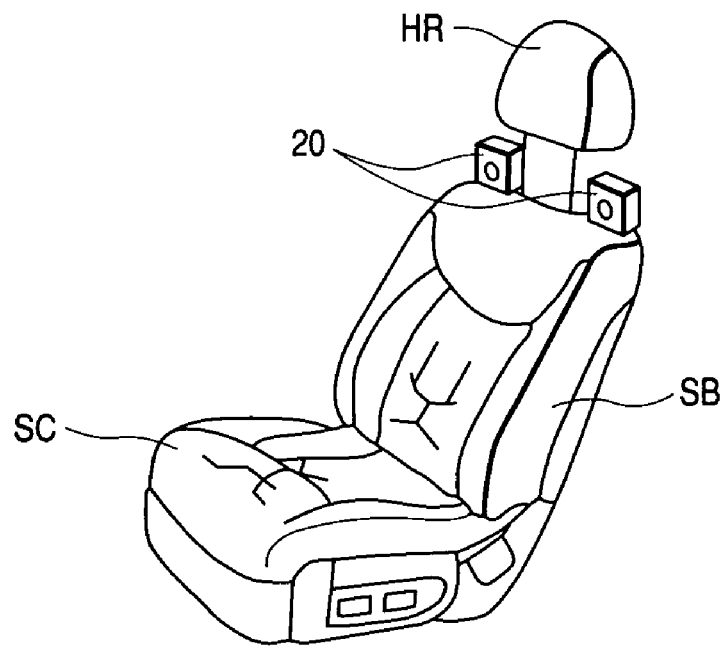
FIG. 12A is a perspective view showing another output section installed on the shoulder of a seatback of an automotive vehicle in accordance with other embodiment of the present invention.
Figure 12B:
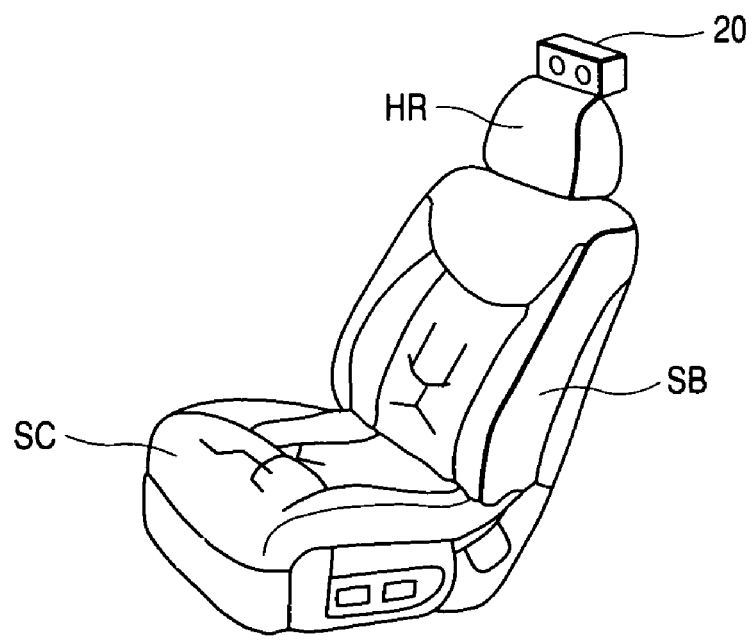
FIG. 12B is a perspective view showing another output section installed on the top of a headrest of an automotive vehicle in accordance with other embodiment of the present invention.

Furthermore, the output section 20 can be installed on the shoulder of the seatback SB as shown in FIG. 12A or on the top of the headrest HR as shown in FIG. 12B.

When the output section 20 is installed inside or in the vicinity of the headrest HR as shown in FIGS. 11A, 12A, and 12B, the sounds emitted from the output section 20 can directly and effectively reach respective ears of a designated driver or passenger without being absorbed or reflected by other portions or members. Furthermore, the output section 20 is positioned at substantially the same or equal distance from respective ears of a designated driver or passenger. This is advantageous in effectively realizing the reproduction of a sound source of a stereo dipole type.

Furthermore, the output section 20 can be placed at any other portion in an automotive vehicle as long as it is positioned at substantially the same or equal distance from respective ears of a designated driver or passenger and unless it narrows the field of view or injures the designated driver or passenger in an event of sudden stop, emergency braking, or car crash.

Although it is ideal that the sounds emitted from the output section 20 directly reach respective ears of a designated driver of passenger, it may be acceptable that indirect sounds reach respective ears of a designated driver or passenger via an intervening medium or member.

Furthermore, when the output section 20 is installed inside the headrest HR, two metallic poles P1 and P2 (refer to FIG. 11A) supporting the headrest HR can be used as power supply or ground paths for the output section 20. In this case, it is preferable to coat or cover the entire surface of each metallic pole P1 or P2 with an insulating film or layer. Furthermore, when a seat is an electrically driven seat according to which a tilt angle or a back-and-forth position of the seat can be automatically adjusted in response to user's manipulation through one-touch buttons or the like, or when an electrically driven massage machine is equipped inside the seat, the power source that is already equipped to drive these electric devices can be utilized as a power source for supplying electric power to the output section 20.

When the output section 50 is installed on the ceiling, a power source provided for a room lamp, a map lamp, or a sunroof can be utilized as a power source for supplying electric power to the output section 50.

Furthermore, the signal producing and processing section 10 can be integrally formed with either the output section 20 or the output section 50. Alternatively, the signal producing and processing section 10 can be separately from both of the output section 20 and the output section 50.

Function and Effect

As apparent from the foregoing description, the above-described embodiments of the present invention provide a sound output apparatus for an automotive vehicle, including sound generating means (20, 20*b*, 50, 50*b*), including at least a pair of loudspeakers (21, 22; 51, 52) disposed adjacently to each other, for generating sounds, and acoustic signal producing means (10, 10*a*, 10*a*', 10*b*) for receiving sound output requirements to identify output sounds to be generated from the sound generating means as well as an alerting direction to which attention of a designated person should be directed and for generating acoustic signals (SR, SL) to be suppled to the sound generating means so that the output sounds cooperatively obtain acoustic image localization in such a manner that a virtual sound source is positioned at a location corresponding to the alerting direction. Specifically, the sound generating means is installed to a predetermined portion of at least a designated seat on which the designated person sits.

According to the sound output apparatus of this invention, a virtual sound source is produced based on the stereo dipole system. The output sounds produced from the loudspeakers come or approach from a direction of the virtual sound source (i.e., from the alerting direction) to the designated person. Hence, the designated person sitting on a designated seat can immediately respond to the emergent situation and can properly direct his/her attention toward the alerting direction.

According to the sound output apparatus of this invention, the sound generating means is installed to a predetermined portion of the designated seat on which the designated person sits. This makes it possible to set or secure a proper distance (e.g., several cm to several tens cm) between the loudspeakers and respective ears of the designated person. The distance between the loudspeakers and respective ears of the designated person is flexibly or arbitrarily changeable (i.e., can be optimized) according to the size of employed loudspeakers or according to the positional relationship between the loudspeakers. Even when very small or compact loudspeakers are used, the sound generating means can be surely installed to an optimum position where clear acoustic or sound image localization is obtained. Furthermore, as the sound generating means is positioned behind or beneath the designated person, the field of view necessary for a driver is not narrowed.

Furthermore, to surely obtain clear acoustic or sound image localization, it is preferable that the sound generating means is positioned on a symmetry axis of the designated seat. According to this arrangement, the sound generating means is positioned at substantially the same or equal distance from respective ears of a designated person.

More specifically, it is preferable that the sound generating means is positioned inside the designated seat, including the inside of a headrest, a seatback or a seat bottom. In this case, it is preferable that the designated seat has a plurality of through-holes or openings provided in the vicinity of the sound generating means for releasing confined sounds out of the seat. The position of the through-holes or openings is not limited to the same side as sound output surfaces of the sound generating means. Therefore, the through-holes or openings can be formed on the opposite side with respect to the sound output surfaces of the sound generating means.

Furthermore, the installation position of the sound generating means is not limited to the inside of the designated seat. Therefore, the sound generating means can be installed on an outer surface of the designated seat. More specifically, it is preferable that the sound generating means is positioned on a shoulder of the designated seat. It is also preferable that the sound generating means is positioned on a top or inside of the headrest (HR) constituting an upper part of the designated seat. It is also preferable that the sound generating means is positioned at the back side of the seatback (SB) of the designated seat. It is also preferable that the sound generating means is positioned beneath the seat bottom (SC) of the designated seat. In any case, the sound generating means does not directly contact with a person sitting on the designated seat. Thus, comfortableness of the seat is not worsened.

The sound generating means should be securely fixed to a stationary portion of the designated seat so that behavior of a person sitting on the designated seat does not change or give adverse influence to the positional relationship between two loudspeakers constituting the sound generating means. Furthermore, when the sound generating means is installed on the shoulder of the designated seat or on the top or inside of the headrest, the distance between the sound generating means and respective ears of a person siting on the designated seat becomes very short. In this case, it will be necessary to prepare compact loudspeakers with small sound output surfaces so that clear acoustic or sound localization can be surely obtained.

Furthermore, when the sound generating means is installed on the top or inside of the headrest, it is possible to utilize the metallic poles (P1, P2) supporting the headrest as power supply or ground paths for the sound generating means. In this case, for the purpose of protecting a driver or passengers from electricity, it is preferable to coat or cover the entire surface of each metallic pole with an insulating film or layer.

The sound output surfaces (which may be called as speaker surfaces) of two loudspeakers cooperatively constituting the sound generating means can be directed to the designated person or to the opposite direction, or can be directed to any one of front, rear, upper, and lower directions of the automotive vehicle. In other words, the direction of the sound output surfaces of two loudspeakers should be adequately set or determined considering the use (i.e., formation of a virtual sound source) and the position where the loudspeakers are installed.

Especially, when the designated seat is a driver's seat, it is preferable that the sound generating means has a sound output surface facing the front side of the automotive vehicle. In this case, it is acceptable that the sound output surface tilts slightly. Or, it is possible to provide the sound generating means placed at the front end side of the seat bottom so that the sound output surface faces the front side of the automotive vehicle, although the sound output surface of the sound generating means is positioned forward with respect to the head of the designated person.

In this case, the relationship between the loudspeakers and the designated person shown in FIG. 13 is reversed. Using this sound generating means makes it possible to produce output sounds having clear acoustic or sound image localization in the blind side of a driver.

The direction in which acoustic or sound image localization can be obtained is dependent on the direction of sound output surfaces irrespective of the positional relationship between the loudspeakers and the designated person. Even when the sound generating means is installed in front of the designated person under the condition where the back side of the loudspeakers faces the designated person, the above-described effects will be enjoyed. In this case, the positional relationship between the designated person and the sound generating means should be determined in the same manner as that shown in FIG. 13. Namely, the angle θ formed between two straight lines connecting respective loudspeakers SP to the designated person is approximately 10° as shown in FIG. 13.

Furthermore, when the sound output surfaces of the sound generating means face the front side of the automotive vehicle, the front side of a designated person becomes an insensible region where clear acoustic or sound localization cannot be obtained. Hence, it is preferable to additionally provide loudspeakers having sound output surfaces facing the rear side of the automotive vehicle. For example, it is preferable that the sound generating means further includes a pair of loudspeakers disposed adjacently to each other and installed on a ceiling or a sun visor attached near an upper edge of a front windshield glass. Alternatively, it is preferable that the sound generating means further includes a pair of loudspeakers disposed beneath an instrument panel or a dashboard or attached to a steering support provided for rotatably supporting a steering wheel.

When the sound generating means is installed on the steering wheel (ST), the positional or angular dislocation of the loudspeakers occurs in accordance with rotation of the steering wheel. Therefore, it is preferable that the acoustic signal producing means includes correcting means (13, 14) for correcting the acoustic signals (SR, SL) based on a steering angle of the steering wheel (ST) and supplying corrected acoustic signals (SR', SL') to the sound generating means.

Furthermore, it is preferable that the sound generating means includes flat panel loudspeakers or micro loudspeakers. The sound generating means can be downsized and reduced in width (i.e., becomes thin) and, therefore, can be easily installed in a narrow or limited space in the automotive vehicle.

Furthermore, the sound generating means can be formed integrally with other portions or formed separately from other portions. When the sound generating means is provided separately from the acoustic signal producing means, it is preferable that the acoustic signal producing means performs radio communication to transmit the acoustic signals (SR, SL) or the corrected acoustic signals (SR', SL') to the sound generating means. This arrangement is preferable in a situation that the sound generating means and the sound generating means are spaced far from each other and cannot be connected via signal lines. Thus, the sound generating means is easy to install and has a great degree of freedom in the installation.

According to the above-described embodiments, a seat on which the designated person sits is chiefly the designated seat where the sound generating means is installed. However, as shown in FIGS. 4C, 10C, and 11C, the sound generating means can be installed on another seat positioned in front of the seat on which the designated person sits.

In this respect, the above-described embodiments of the present invention provides a sound output apparatus for an automotive vehicle, including sound generating means (20, 20b, 50, 50b), including at least a pair of loudspeakers (21, 22; 51, 52) disposed adjacently to each other, for generating sounds, and acoustic signal producing means (10, 10a, 10a', 10b) for receiving sound output requirements to identify output sounds to be generated from the sound generating means as well as an alerting direction to which attention of a designated person should be directed and for generating acoustic signals (SR, SL) to be supplied to the sound generating means so that the output sounds cooperatively obtain acoustic image localization in such a manner that a virtual sound source is positioned at a location corresponding to the alerting direction. Specifically, the sound generating means is installed on at least a designated seat positioned in front of a seat on which the designated person sits.

Furthermore, it is preferable that the acoustic signal producing means includes an acoustic sound signal database (DBO) which stores beforehand numerous sound data for synthesizing the acoustic signals (SR, SL) corresponding to all of the possible combinations between the output sounds and the alerting direction. In this case, the acoustic signal producing means reads out optimum sound data for the acoustic signals (SR, SL) with reference to the identified output sounds and the alerting direction.

Furthermore, it is preferable that the acoustic signal producing means includes an original sound signal database (DBG) which stores beforehand numerous original sound data for synthesizing the acoustic signals corresponding to the output sounds. In this case, the acoustic signal producing means reads out optimum original sound data for the acoustic signals with reference to the identified output sounds. Then, the acoustic signal producing means modifies the readout original sound data according to the identified alerting direction, so as to obtain intended acoustic image localization in such a manner that a virtual sound source is positioned at a location corresponding to the identified alerting direction. According to this arrangement, the original sound signal database (DBG) is very small in a required memory capacity compared with that of the acoustic signal database (DBO).

Furthermore, when the output sounds are warning sounds or alarms for evoking the caution of the designated person and letting the designated person act or behave appropriately to avoid the encountering danger or abnormality, the alerting direction is a direction of an object which has the cause of danger or abnormality. When the output sounds are guide voice or speech, the alerting direction is a direction that indicates the contents of guidance or a direction of a target being suggested in the guidance.

The sound output requirements are, for example, obtainable from car-equipped devices which can detect driving conditions of oneself and the cars surrounding and also can judge the presence of any danger or abnormality. For example, the car-equipped devices include the sonar or comparable sensors installed at each of the four corners of a vehicle body or front and rear edges of a vehicle body, or the one monitoring an obstacle existing in the blind side of a driver, or the one notifying the presence of any obstacle possibly endangering the vehicle when traveling, or the one notifying incomplete closing of each door.

Furthermore, the sound output requirements include the information obtainable from guide information provided from a car navigation system, or the information obtainable based on the vehicle-to-road communications and/or vehicle-to-vehicle communications.

What is claimed is:

1. A sound output apparatus for an automotive vehicle, comprising:
    acoustic signal producing means for receiving a sound output requirement from a portion of a vehicle, designating a type of sounds according to the sound output requirement, identifying an alerting direction to which attention of a designated person should be directed, producing an acoustic signal indicating the type of sounds and the alerting direction; and
    sound generating means, including at least a pair of loudspeakers disposed adjacently to each other and installed on a predetermined portion of a designated seat on which the designated person sits, for receiving the acoustic signal from said acoustic signal producing means and generating output sounds of the type indicating acoustic image localization according to the acoustic signal such that the designated person feels as if a source of the output sounds generated at the predetermined portion of the designated seat is positioned in the alerting directions,
    wherein the sound generating means has a first pair of loudspeakers so as to have a sound output surface facing a front side of the automotive vehicle and a second pair of loudspeakers installed on a steering wheel so as to have sound output surfaces facing a rear side of the automotive vehicle, and
    wherein the acoustic signal producing means includes correcting means for correcting the acoustic signals based on a steering angle of the steering wheel and supplying corrected acoustic signals to the second pair of loudspeakers of the sound generating means.

2. The sound output apparatus for an automotive vehicle in accordance with claim 1, wherein said sound generating means is positioned on a symmetry axis of said designated seat.

3. The sound output apparatus for an automotive vehicle in accordance with claim 1, wherein said sound generating means is positioned inside said designated seat.

4. The sound output apparatus for an automotive vehicle in accordance with claim 3, wherein said designated seat has a plurality of through-holes or openings provided in the vicinity of said sound generating means.

5. The sound output apparatus for an automotive vehicle in accordance with claim 1, wherein said sound generating means is positioned on a shoulder of said designated seat.

6. The sound output apparatus for an automotive vehicle in accordance with claim 1, wherein said sound generating means is positioned on a top of a headrest constituting an upper part of said designated seat.

7. The sound output apparatus for an automotive vehicle in accordance with claim 1, wherein said sound generating means is positioned at a back side of a seatback of said designated seat.

8. The sound output apparatus for an automotive vehicle in accordance with claim 1, wherein said sound generating means is positioned beneath a seat bottom of said designated seat.

9. The sound output apparatus for an automotive vehicle in accordance with claim 1, wherein
    said sound generating means further includes a third pair of loudspeakers disposed adjacently to each other and installed on a ceiling or a sun visor attached near an upper edge of a front windshield glass, and
    said third pair of loudspeakers, installed on said ceiling or said sun visor, have sound output surfaces facing a rear side of the automotive vehicle.

10. The sound output apparatus for an automotive vehicle in accordance with claim 1, wherein
    said sound generating means further includes a third pair of loudspeakers disposed beneath an instrument panel or a dashboard or attached to a steering support provided for rotatably supporting a steering wheel, and
    said third pair of loudspeakers, disposed beneath said instrument panel or said dashboard or attached to said steering support, have sound output surfaces facing a rear side of the automotive vehicle.

11. The sound output apparatus for an automotive vehicle in accordance with claim 1, wherein said sound generating means includes flat panel loudspeakers or micro loudspeakers.

12. The sound output apparatus for an automotive vehicle in accordance with claim 1, wherein said acoustic signal producing means performs radio communication to supply said acoustic signals or said corrected acoustic signals to said sound generating means.

13. A sound output apparatus for an automotive vehicle, comprising:
    acoustic signal producing means for receiving a sound output requirement from a portion of a vehicle, designating a type of sounds according to the sound output requirement, identifying an alerting direction to which attention of a designated person should be directed, producing an acoustic signal indicating the type of sounds and the alerting direction; and
    sound generating means, including at least a pair of loudspeakers disposed adjacently to each other and installed on a designated seat positioned in front of a seat on which the designated person sits, for receiving the acoustic signal from said acoustic signal producing means and generating output sounds of the type indicating acoustic image localization according to the acoustic signal such that the designated person feels as if a source of the output sounds generated at the designated seat is positioned in the alerting direction,
    wherein the sound generating means has a first pair of loudspeakers so as to have a sound output surface facing a front side of the automotive vehicle and a second pair of loudspeakers installed on a steering wheel so as to have sound output surfaces facing a rear side of the automotive vehicle, and
    wherein the acoustic signal producing means includes correcting means for correcting the acoustic signals based on a steering angle of the steering wheel and supplying corrected acoustic signals to the second pair of loudspeakers of the sound generating means.

14. A sound output apparatus for an automotive vehicle comprising:
   acoustic signal producing means for receiving a sound output requirement from a portion of a vehicle, designating a type of sound according to the sound output reqiuirement, identifying an alerting direction to which attention of a designated person should be directed, producing an acoustic signal indicating the type of sound and the alerting direction; and
   sound generating means, including a first pair of loudspeakers disposed adjacently to each other and installed to a predetermined portion of a designated seat on which the designated person sits, for receiving the acoustic signal from said acoustic signal producing means and generating output sounds of the type indicating acoustic image localization according to the acoustic signal such that the designated person feels as if a source of the output sounds generated at the predetermined portion of the designated seat is positioned in the alerting direction,
   wherein a central point of the loudspeakers of the pair included in said sound generating means is positioned on a synunetry axis of the designated seat so as to position the loudspeakers at the substantially same distance from respective ears of the designated person.

15. The sound output apparatus for an automotive vehicle in accordance with claim 14, wherein the first pair of loudspeakers reproduces the source of the output sounds of a stereo dipole type.

16. The sound output apparatus for an automotive vehicle in accordance with claim 14, wherein said sound generating means is positioned on a symmetry axis of said designated seat.

17. The sound output apparatus for an automotive vehicle in accordance with claim 14, wherein said sound generating means is positioned inside said designated seat.

18. The sound output apparatus for an automotive vehicle in accordance with claim 17, wherein said designated seat has a plurality of through-holes or openings provided in the vicinity of said sound generating means.

19. The sound output apparatus for an automotive vehicle in accordance with claim 14, wherein said sound generating means is positioned on a shoulder of said designated seat.

20. The sound output apparatus for an automotive vehicle in accordance with claim 14, wherein said sound generating means is positioned on a top of a headrest constituting an upper part of said designated seat.

21. The sound output apparatus for an automotive vehicle in accordance with claim 14, wherein said sound generating means is positioned at a back side of a seatback of said designated seat.

22. The sound output apparatus for an automotive vehicle in accordance with claim 14, wherein said sound generating means is positioned beneath a seat bottom of said designated seat.

23. The sound output apparatus for an automotive vehicle in accordance with claim 14, wherein said designated seat is a driver's seat and said sound generating means has a sound output surface facing a front side of the automotive vehicle.

24. The sound output apparatus for an automotive vehicle in accordance with claim 23, wherein
   said sound generating means further includes a second pair of loudspeakers disposed adjacently to each other and installed on a ceiling or a sun visor attached near an upper edge of a front windshield glass, and
   said second pair of loudspeakers, installed on said ceiling or said sun visor, have sound output surfaces facing a rear side of the automotive vehicle.

25. The sound output apparatus for an automotive vehicle in accordance with claim 23, wherein
   said sound generating means further includes a second pair of loudspeakers disposed beneath an instrument panel or a dashboard or attached to a steering support provided for rotatably supporting a steering wheel, and
   said second pair of loudspeakers, disposed beneath said instrument panel or said dashboard or attached to said steering support, have sound output surfaces facing a rear side of the automotive vehicle.

26. The sound output apparatus for an automotive vehicle in accordance with claim 23, wherein
   said sound generating means further includes a second pair of loudspeakers installed on a steering wheel so as to have sound output surfaces facing a rear side of the automotive vehicle, and
   said acoustic signal producing means includes correcting means for correcting said acoustic signals based on a steering angle of said steering wheel and supplying corrected acoustic signals to said sound generating means.

27. The sound output apparatus for an automotive vehicle in accordance with claim 14, wherein said sound generating means includes flat panel loudspeakers or micro loudspeakers.

28. The sound output apparatus for an automotive vehicle in accordance with claim 14, wherein said acoustic signal producing means performs radio communication to supply said acoustic signals or correceted acoustic signals to said sound generating means.

29. A sound output apparatus for an automotive vehicle comprising:
   acoustic signal producing means for receiving a sound output reciuirement from a portion of a vehicle, designating a type of sound according to the sound output reciuirement, identifying an alerting direction to which attention of a designated person should be directed, producing an acoustic signal indicating the type of sound and the alerting direction; and
   sound generating means, including a pair of loudspeakers disposed adjacently to each other and installed on a designated seat positioned in front of a seat on which the designated person sits, for receiving the acoustic signal from said acoustic signal producing means and generating output sounds of the type indicating acoustic image localization according to the acoustic signal such that the designated person feels as if a source of the output sounds generated at the designated seat is positioned in the alerting direction,
   wherein a central point of the loudspeakers of the pair included in said sound generating means is positioned on a symmetry axis of the designated seat so as to position the loudspeakers at the substantially same distance from respective ears of the designated person.

30. The sound output apparatus for an automotive vehicle in accordance with claim 29, wherein the pair of loudspeakers reproduces the source of the output sounds of a stereo dipole type.

* * * * *